(12) United States Patent
Matoba

(10) Patent No.: US 8,773,695 B2
(45) Date of Patent: Jul. 8, 2014

(54) DATA COMMUNICATION APPARATUS AND METHOD OF CONTROLLING THE SAME

(75) Inventor: Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/278,812

(22) Filed: Oct. 21, 2011

(65) Prior Publication Data

US 2012/0147418 A1    Jun. 14, 2012

(30) Foreign Application Priority Data

Dec. 10, 2010  (JP) ................................ 2010-276385

(51) Int. Cl.
*G06K 15/02* (2006.01)

(52) U.S. Cl.
USPC ........ 358/1.15; 358/1.13; 358/1.16; 358/401; 358/440

(58) Field of Classification Search
USPC ........ 358/1.13, 1.15, 1.16, 401, 440; 709/206
See application file for complete search history.

(56) References Cited

U.S. PATENT DOCUMENTS

| 8,108,549 | B2 * | 1/2012 | Craft et al. | 709/238 |
| 2003/0135564 | A1 * | 7/2003 | Tsuchiya | 709/206 |
| 2004/0130747 | A1 * | 7/2004 | Ohishi et al. | 358/1.15 |
| 2006/0075123 | A1 * | 4/2006 | Burr et al. | 709/228 |
| 2007/0086062 | A1 * | 4/2007 | Song | 358/401 |
| 2010/0214587 | A1 * | 8/2010 | Sambe | 358/1.13 |
| 2011/0026075 | A1 * | 2/2011 | Maruyama et al. | 358/1.15 |
| 2011/0078631 | A1 * | 3/2011 | Maeda et al. | 715/824 |

FOREIGN PATENT DOCUMENTS

JP    2007-188166 A    7/2007

* cited by examiner

*Primary Examiner* — Allen H Nguyen
(74) *Attorney, Agent, or Firm* — Fitzpatrick, Cella, Harper and Scinto

(57) ABSTRACT

In a data communication apparatus which communicates with another data communication apparatus via a network, and a method of controlling the same, an address book in which a plurality of addresses used to send data are registered is published to other data communication apparatus via the network, and in a case that a loopback address is included in the plurality of addresses registered in that address book, the other data communication apparatus is restricted from accessing the address book including the loopback address.

10 Claims, 7 Drawing Sheets

FIG. 6

NEW ADDRESS REGISTRATION SCREEN

- NAME : Scott's folder — 601
- PROTOCOL : SMB ▽ — 602
- HOST NAME : ￥￥localhost — 603
- FOLDER PATH : ￥share — 604
- USER NAME : scott — 605
- PASSWORD : ******** — 606

[ REFERENCE ]

[ CANCEL ] [ REGISTRATION ]
610

FIG. 7

LOOPBACK ADDRESS CONFIRMATION

SELECT ADDRESS TO BE REGISTERED IN ADDRESS BOOK

- 701 — ○ ADDRESS OF SENDING SOURCE APPARATUS AT THE TIME OF SENDING : 127.0.0.1
- 702 — ○ ADDRESS OF APPARATUS POSSESSING ADDRESS BOOK : 168.0.0.1
- 703 — ○ ADDRESS OF APPARATUS FOR ACCESSING ADDRESS BOOK : 168.0.02

[ CANCEL ] [ OK ]
711         710

DATA COMMUNICATION APPARATUS AND METHOD OF CONTROLLING THE SAME

BACKGROUND OF THE INVENTION

1. Field of the Invention

The present invention relates to a data communication apparatus which allows an external apparatus to register an address in an address book as a list of addresses used upon sending and transfer of data, and also allows the external apparatus to refer to the address book, and a method of controlling the same.

2. Description of the Related Art

An image forming apparatus such as an MFP (Multi Function Peripheral) includes an address book used to register addresses used upon sending and transfer of data. In order to allow a plurality of image forming apparatuses to commonly access the address book, the address book can be delivered to another image forming apparatus via a network. A technique for generating, at the time of delivery of the address book to other image forming apparatuses, an address book suited to each apparatus by distinguishing addresses to be commonly distributed to all image forming apparatuses and those to be individually distributed to each apparatus has been proposed (for example, Japanese Patent Laid-Open No. 2007-188166).

As a method of allowing a plurality of image forming apparatuses to access an address book of an image forming apparatus, a technique that allows a given image forming apparatus to directly refer to an address book of another image forming apparatus via a network is also known.

Assuming that a file management system in an image forming apparatus has a file server function, an external apparatus, which is connected to the image forming apparatus via a network, can access the file management system in the image forming apparatus as a normal file server. Protocols provided as the file server function include, for example, SMB (Server Message Block), CIFS (Common Internet File System), WebDAV (Web-based Distributed Authoring and Versioning), and FTP (File Transfer Protocol).

When the image forming apparatus serves as the file server function, an address provided by the file server function by the image forming apparatus itself can be registered and accessed as a destination in an address book of the image forming apparatus. In this case, as the address of the file server provided by the image forming apparatus, a loopback address can also be designated. For example, if it is assumed that the file server function of the image forming apparatus (having, for example, an IP address "168.0.0.1") allows an external apparatus to access a folder "share" managed by its file management system. In this case, a loopback address "¥¥localhost¥share" or "¥¥127.0.0.1¥share" can be designated in place of registering an SMB path "¥¥168.0.0.1¥share" in the address book. However, when a loopback address ("localhost", "127.0.0.1", or "::1") of the image forming apparatus itself is registered in the address book of the image forming apparatus, the following problems are posed.

When an address book possessed inside an image forming apparatus (server) is registered from an external image forming apparatus (client), an address as a loopback address may be registered in the address book of the server. In this case, it is unknown whether the address to be registered intends that of the server or client. As a result, although the client attempts to register a loopback address in the address book of the server, since the loopback address is an address of another image forming apparatus, data may be transferred to the other apparatus corresponding to the address.

With the technique described in Japanese Patent Laid-Open No. 2007-188166 above, upon distributing an address book from a server to all image forming apparatuses, the address book can be distributed while distinguishing addresses to be distributed to all the image forming apparatuses, and those to be distributed individually. However, that technique cannot distinguish whether an address designated as a loopback address designates the server, a specific client, or an image forming apparatus as an operation source at the time of sending/transfer processing.

SUMMARY OF THE INVENTION

An aspect of the present invention is to eliminate the above-mentioned problems in the conventional technology.

A feature of the present invention is to provide a technique with which when a loopback address is registered in an address book published to an external apparatus, an address intended by the loopback address can be confirmed and registered.

Another feature of the present invention is to provide a technique that allows an external apparatus to refer to and access an address book including a loopback address.

According to an aspect of the present invention, there is provided a data communication apparatus for communicating with another data communication apparatus via a network, comprising: an address book storage unit configured to manage an address book in which a plurality of addresses used to send data are registered; an address book publication unit configured to publish the address book managed by the address book storage unit to other data communication apparatus via the network; and a control unit configured to restrict, in a case that a loopback address is included in the plurality of addresses registered in the address book, the other data communication apparatus from accessing the address book including the loopback address.

According to another aspect of the present invention, there is provided a method of controlling a data communication apparatus for communicating with another data communication apparatus via a network, the method comprising: managing an address book in which a plurality of addresses used to send data are registered; publishing the managed address book to other data communication apparatus via the network; and restricting, in a case that a loopback address is included in the plurality of addresses registered in the address book, the other data communication apparatus from accessing the address book including the loopback address.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view showing an example of a file sending destination setting screen;

FIG. 7 depicts a view showing an example of a loopback address confirmation screen;

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

This embodiment will exemplify an image forming processing system in a representative embodiment of the present invention. This embodiment will exemplify an image forming apparatus such as an MFP (Multi Function Peripheral) as an example of a data communication apparatus. However, the data communication apparatus of the present invention is not limited to such specific image forming apparatus. For example, an information processing apparatus such as a PC may be used.

Figure 1:
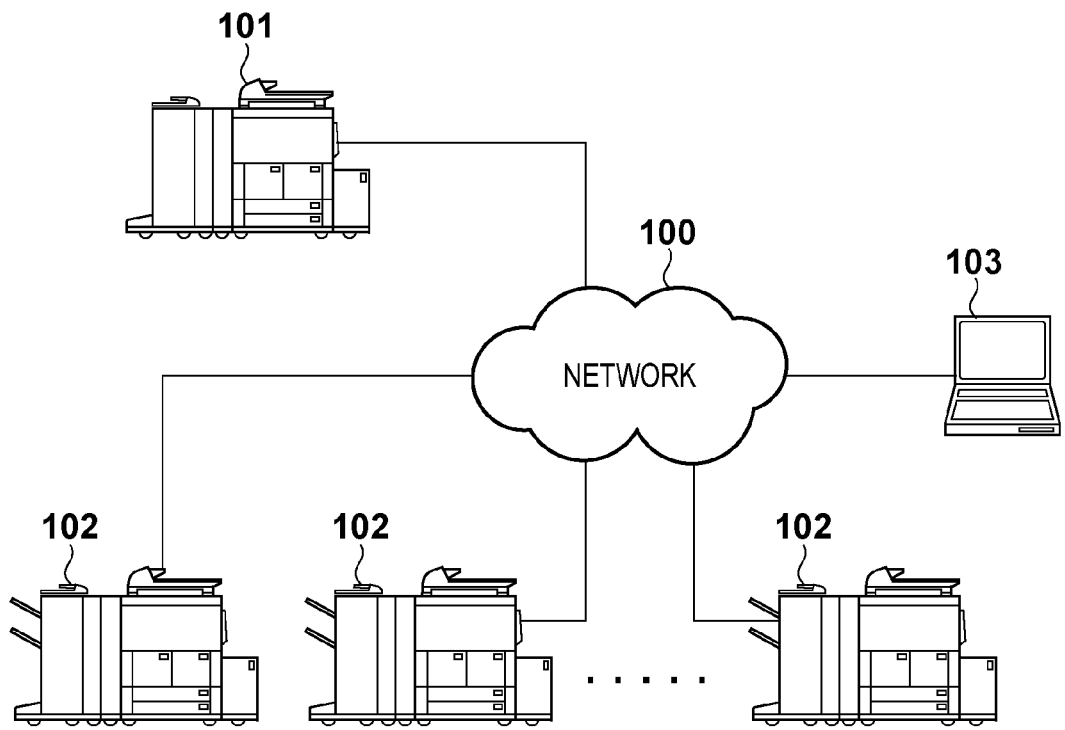
FIG. 1 depicts a view showing the overall arrangement of a system including image forming apparatuses according to an embodiment of the present invention.

FIG. 1 shows the overall arrangement of a system including image forming apparatuses according to an embodiment of the present invention.

Referring to FIG. 1, an image forming apparatus 101, which serves as a server, and a plurality of image forming apparatuses 102 and a PC 103, which serve as clients, are connected via a network 100. Note that the numbers of these image forming apparatuses and PCs are not limited to those of this arrangement shown in FIG. 1. The image forming apparatuses 102 have the same arrangement. The image forming apparatuses 101 and 102 have network interfaces, which are connected to the network 100 and exchange various data with the network 100. These image forming apparatuses 101 and 102 are those represented by MFPs (Multi Function Peripherals). These image forming apparatuses are configured to allow external apparatuses to access an address book and image files stored in internal storage units via the network 100.

The PC 103 is a general information processing apparatus (PC), which has a network interface connected to the network 100 to exchange various data with the network 100, and includes a CPU, ROM, RAM, HDD, and the like. The PC 103 has a general browser program used to browse files and folders on the server via the network 100, and a general mail application used to exchange e-mail messages. The PC 103 can issue print requests to the image forming apparatuses 101 and 102 in response to operations of an operator, and can receive data sent from the image forming apparatuses 101 and 102 via the network 100. The PC 103 can make various settings in the image forming apparatuses 101 and 102 by operations of the operator.

As the network 100, this embodiment will exemplify a LAN (Local Area Network). However, the network 100 may be another network system such as the Internet.

Figure 2:
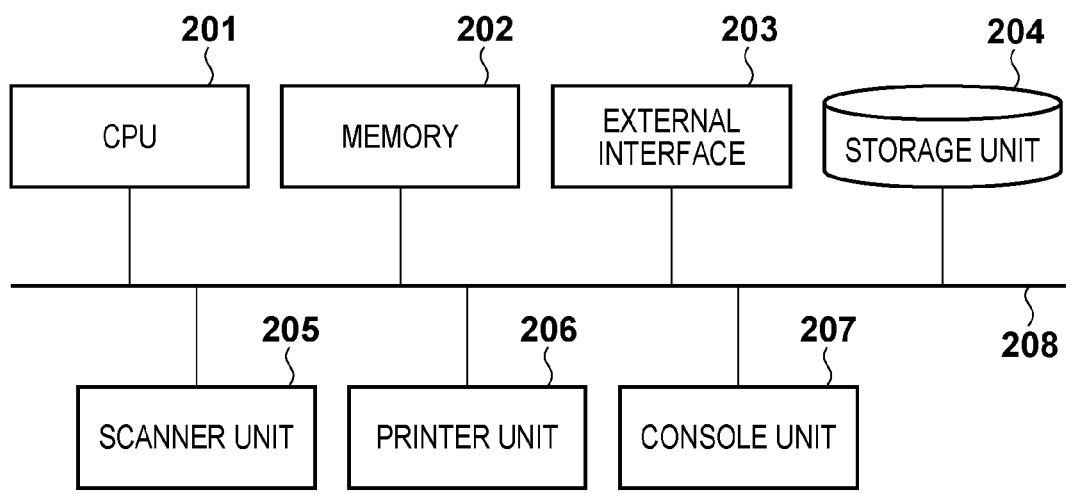
FIG. 2 is a block diagram for explaining the principal arrangement of the image forming apparatus according to the embodiment of the present invention.

FIG. 2 is a block diagram for explaining the internal principal arrangement of the image forming apparatuses 101 and 102 according to this embodiment.

Each of the image forming apparatuses 101 and 102 is that (MFP) having various functions such as scan, print, copy, sending/reception, box, and the like. Each of the image forming apparatuses 101 and 102 includes a CPU 201, memory 202, external interface 203, storage unit 204, scanner unit 205, printer unit 206, and console unit 207. The CPU 201 controls the operations of the overall image forming apparatus, and implements, for example, scan, print, and sending/reception operations by reading out and executing programs stored in the memory 202 and storage unit 204 to issue instructions to the respective units. The memory 202 has a ROM which stores various programs to be executed by the CPU 201, a RAM which temporarily stores data required for, for example, control, and the like. Various programs include a console control section 301, address book processing section 302, loopback address processing section 303, sending control section 304, reception and transfer control section 305, file server control section 306, address book publication section 310, and external address book reference section 410, which will be described later with reference to FIGS. 3 and 4. The external interface 203 exchanges information via the network 100 or the like with other image forming apparatuses, the PC 103, and the like. The storage unit 204 is configured by a nonvolatile memory such as a hard disk, and stores image files and the like generated by respective processes. Also, the storage unit 204 stores control information and setting information used in the respective processes. Furthermore, the storage unit 204 includes an address book storage section 307, sending setting storage section 308, image file storage section 309, and the like, which will be described later with reference to FIGS. 3 and 4. Data is read out from and written in this storage unit 204 via the memory 202. Note that the storage unit 204 may store various programs in place of the ROM of the memory 202. In this case, programs installed in the storage unit 204 are loaded onto the RAM of the memory 202 when they are executed.

The scanner unit 205 optically reads a document image by irradiating a document placed on a platen glass with illumination light, and generates image data by converting the document image into an electrical signal. In this embodiment, the printer unit 206 forms an image on a printing sheet when a laser exposure unit, image forming unit, fixing unit, and paper feed/conveyance unit cooperate with each other. However, the printer unit 206 is not limited to this type of printer. For example, an ink-jet printer and printers of other systems may be used. The console unit 207 has a touch panel and various keys, which are operated by the user to input various operation instructions and the like, a display unit, and the like. An internal bus 208 connects the respective units, and transfer operations of image data, and exchange operations of instructions and setting values to the respective units are performed via this internal bus 208.

Figure 3:
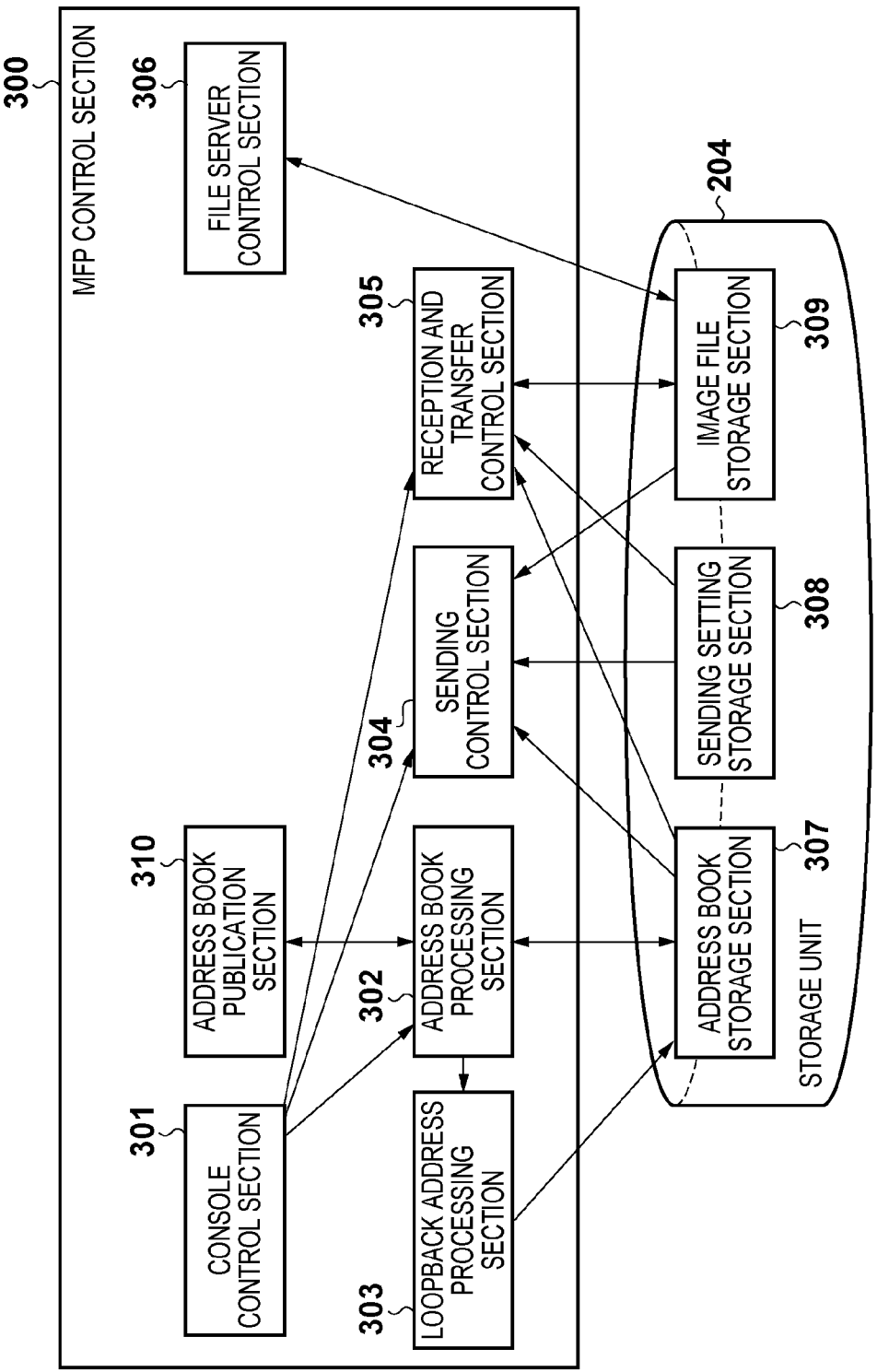
FIG. 3 is a block diagram showing the software configuration of an image forming apparatus 101.

FIG. 3 is a block diagram showing the software configuration of the image forming apparatus 101 which serves as the server according to this embodiment. An MFP control section 300 has an address book publication function which publishes an address book stored in the address book storage section 307 to be referred to from an external apparatus via the network 100.

Referring to FIG. 3, reference numerals 301 to 306 and 310 denote processing modules, which configure the MFP control section 300. These processing modules are those which operate as application programs executed by the CPU 201 or parts of the programs. The storage unit 204 and information storage sections 307 to 309 included in the storage unit 204 store programs and various data included in this MFP control section 300. Information stored in the storage unit 204 and information storage sections 307 to 309 included in the storage unit 204 is accessible according to a specific key operation or conditions. Note that arrows in FIG. 3 indicate principal flows of data and processes. Respective processing modules will be described below.

The console control section 301 operates according to an instruction from the CPU 201, and controls the console unit 207 having the touch panel and key input unit of the image forming apparatus 101. That is, information issued when the user operates the console unit 207 is transmitted to the respective units via the console control section 301, and the image forming apparatus 101 operates according to the information. The address book processing section 302 operates according to an instruction from the CPU 201. That is, the address book processing section 302 registers a new address in the address book stored in the address book storage section 307 in accordance with a request from the console control section 301 or a request from the image forming apparatus 102 or PC 103, which is input from the external interface 203 via the network 100. Also, the address book processing section 302 executes processing for referring to an address registered in the address book. In addition, the address book processing section 302 can execute processing for updating and deleting addresses in the address book stored in the address book storage section 307.

The loopback address processing section 303 operates according to an instruction from the CPU 201. When a new address to be registered by the address book processing section 302 includes a loopback address, the address book processing section 302 sends an instruction to the loopback address processing section 303. Then, the loopback address processing section 303 permits or inhibits registration of the loopback address in the address book in the address book storage section 307. Also, the loopback address processing section 303 makes a setting for converting the loopback address into an address unique to a specific apparatus, and executes processing for inhibiting the loopback address, which is permitted to be registered in the address book, from being referred to from an external apparatus. These processes will be described in detail later.

The sending control section 304 operates according to an instruction from the CPU 201. The sending control section 304 sends an image file stored in the image file storage section 309 to an address selected from the address book stored in the address book storage section 307 in accordance with a request from the console control section 301 or an instruction which is set in advance in the sending setting storage section 308.

The reception and transfer control section 305 operates according to an instruction from the CPU 201. The reception and transfer control section 305 specifies an operation method (print, save, transfer, etc.) upon reception of image data via the external interface 203, and stores the specified method in the sending setting storage section 308 in accordance with a request from the console control section 301. When image data is received via the network 100, and matches a transfer condition set in the sending setting storage section 308, the reception and transfer control section 305 acquires an address of a transfer destination with reference to the address book storage section 307. Then, the reception and transfer control section 305 transfers, to that address, an image file which is acquired from the image file storage section 309 and is converted into that to be sent.

The file server control section 306 provides a file server function that allows the external image forming apparatus 102 and PC 103 to access image files stored in the image file storage section 309 via the network 100. The file server control section 306 operates according to an instruction from the CPU 201, is compatible with protocols such as SMB, WebDAV, and FTP, and executes data control according to the compatible protocols. Under the control of the file server control section 306, the image forming apparatus 102 and PC 103 can execute read/write accesses to image files and folders managed by the image file storage section 309 in the storage unit 204 via the external interface 203. Also, under the control of this file server control section 306, image files sent from the sending control sections 304 and reception and transfer control sections 305 in the image forming apparatuses 101 and 102 can be stored in the image file storage section 309.

The address book publication section 310 operates according to an instruction from the CPU 201. The address book publication section 310 accesses the address book stored in the address book storage section 307 in the storage unit 204 of the image forming apparatus 101 via the address book processing section 302, and externally publishes the address book via the external interface 203. Addresses registered in the address book published by the image forming apparatus 101 are referred to from the image forming apparatuses 102 and PC 103. Especially, each image forming apparatus 102 can send an image file and the like by designating the referred address. When the image forming apparatuses 101 and 102 cooperate with each other in this way, the address book stored in the address book storage section 307 in the image forming apparatus 101 can be shared and accessed by the image forming apparatuses 101 and 102. For this reason, when one image forming apparatus, which serves as the server, stores the address book, the external image forming apparatuses need not store any address book.

Furthermore, the address book publication section 310 holds a setting as to whether or not to publish the address book to external apparatuses (external publication setting). If the external publication setting is valid, the external apparatuses such as the image forming apparatuses 102 and PC 103 can refer to addresses registered in the address book. Furthermore, when the external publication setting is valid, the external apparatuses can register a new address in the address book stored in the address book storage section 307. On the other hand, if the external publication setting is invalid, the external apparatuses neither refer to addresses registered in the address book nor register a new address in the address book. The external publication setting is set in advance by an administrator via the console unit 207 of the image forming apparatus 101.

The address book storage section 307 stores the address book in the storage unit 204. The address book stored in the address book storage section 307 includes information such as destination names, sending methods, sending protocols, host names, folder paths, user names, passwords, and the like. This address book is used to acquire an address at the time of sending processing of the sending control section 304 and at the time of reception and transfer processing of the reception and transfer control section 305. Also, the address book is registered in the address book storage section 307 by the address book processing section 302. Furthermore, in the address book storage section 307, a loopback address processing method, which specifies a processing method when a loopback address is included in address information in the address book, is also registered.

The sending setting storage section 308 stores sending setting information, reception and transfer setting information, and the like in the storage unit 204. The sending setting information, and reception and transfer setting information stored in the sending setting storage section 308 include information such as sending addresses, sending times, sending file setting information, and the like. These sending setting information, and reception and transfer setting information are referred to and accessed at the time of sending processing of the sending control section 304 and at the time of reception and transfer processing of the reception and transfer control section 305.

The image file storage section 309 stores image files which store image data, and management information associated with the image files in the storage unit 204. The image file storage section 309 stores image data obtained by converting image data scanned by the scanner unit 205 in accordance with an instruction from the console control section 301, and image data received by the reception and transfer control section 305. Also, in response to an instruction from the console control section 301, an image file stored in the image file storage section 309 can be output to and printed by the printer unit 206. Furthermore, under the control of the file server control section 306, image files stored in the image file storage section 309 can be referred to and they can be registered in the image file storage section 309 via the network 100.

Figure 4:
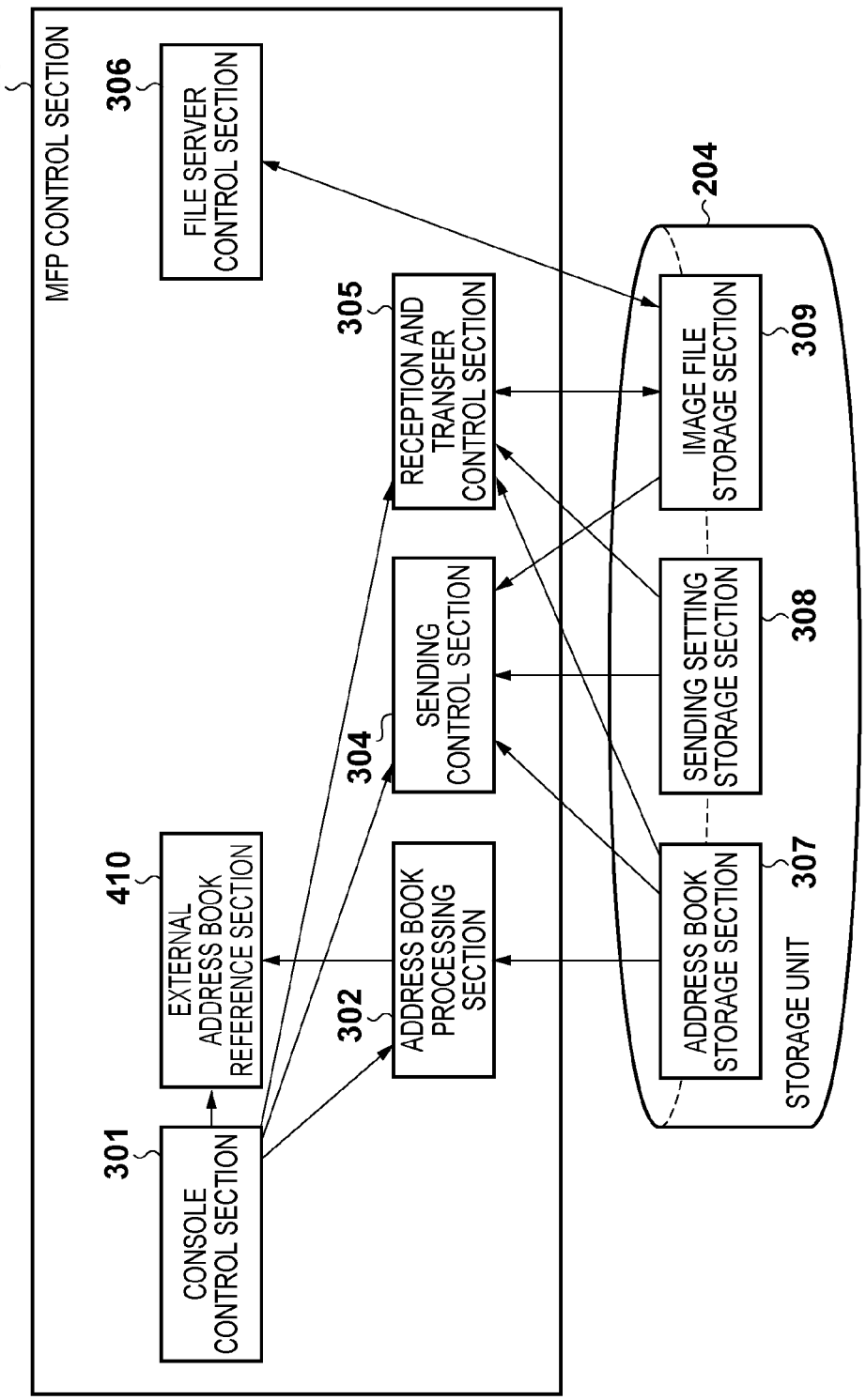
FIG. 4 is a block diagram showing the software configuration of an image forming apparatus 102.

FIG. 4 is a block diagram showing the software configuration of each image forming apparatus 102 according to this embodiment. A characteristic feature of each image forming apparatus 102 is to communicate with the image forming apparatus 101 (address book publication section 310) to refer to addresses registered in the address book of the image forming apparatus 101. Note that the same reference numerals in FIG. 4 denote sections common to those shown in FIG. 3 described above, and a description thereof will not be repeated.

Note that processing modules which configure an MFP control section 400 are those which operate as application programs used by the CPU 201 or parts of the programs. The storage unit 204 and information storage sections 307 to 309 included in the storage unit 204 store programs and various data included in this MFP control section 400. Information stored in the storage unit 204 and information storage sections 307 to 309 included in the storage unit 204 is accessible according to a specific key operation or conditions. Note that arrows in FIG. 4 indicate principal flows of data and processes.

The external address book reference section 410 operates according to an instruction from the CPU 201. The external address book reference section 410 sends a reference request of addresses registered in the address book to the address book publication section 310 of the image forming apparatus 101 via the external interface 203 and network 100 in response to an instruction from the console control section 301. Also, the external address book reference section 410 sends a registration request of a new address in the address book of the image forming apparatus 101. The external address book reference section 410 receives addresses, which are distributed from the address book publication section 310 of the image forming apparatus 101 and are registered in the address book, and can store them in the address book storage section 307 of the image forming apparatus 102 via the address book processing section 302 of the image forming apparatus 102. In this manner, when the address book publication section 310 of the image forming apparatus 101 cooperates with the external address book reference section 410 of the image forming apparatus 102, the image forming apparatus 102 can access the address book stored in the address book storage section 307 of the image forming apparatus 101.

Figure 5:
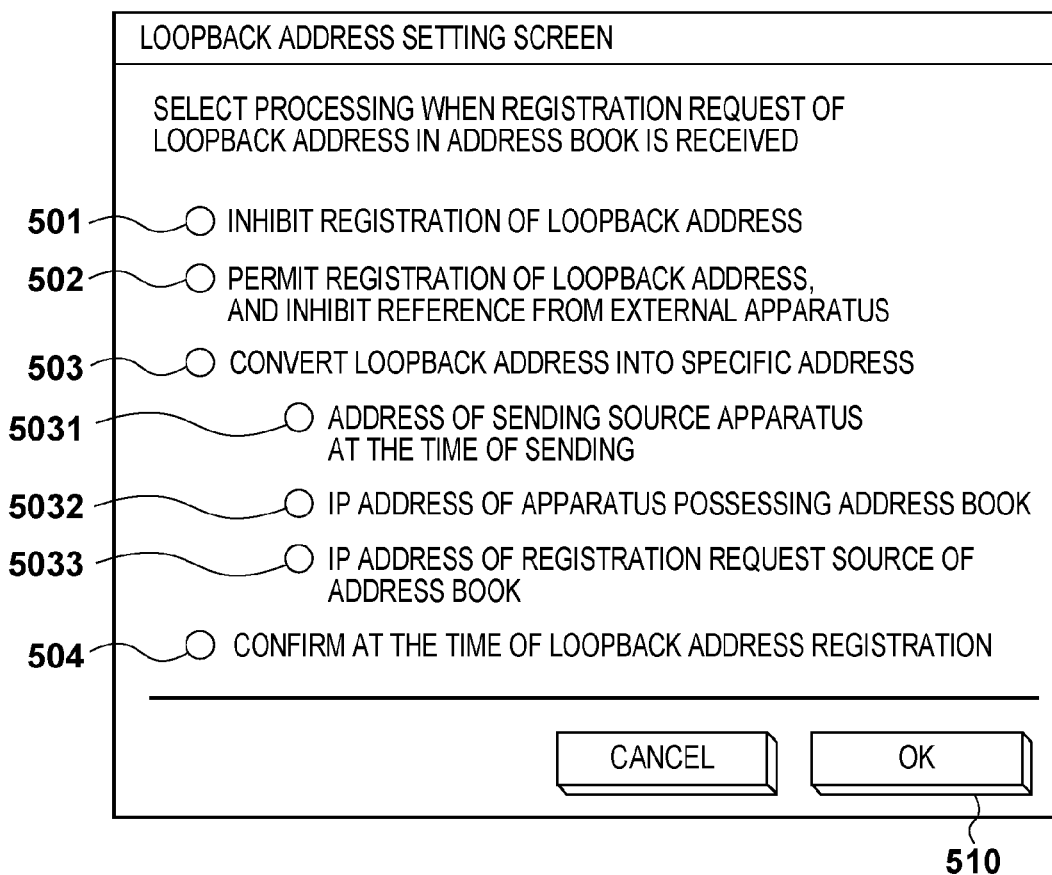
FIG. 5 depicts a view showing an example of a loopback address setting screen according to the embodiment.

FIG. 5 shows an example of a loopback address setting screen, which is displayed on the console unit 207 of the image forming apparatus 101 according to this embodiment, and is used to specify a loopback address processing method.

Information, which is displayed and set on this loopback address setting screen, is stored in the address book storage section 307 of the storage unit 204 managed by the address book processing section 302. This loopback address setting screen is a setting screen used when an administrator of the image forming apparatus 101 prescribes a behavior upon designation of a loopback address as an address in advance.

The administrator selects (checks) a radio button 501 when registration of a loopback address is inhibited. When this radio button 501 is checked, registration of new loopback addresses in the address book stored in the address book storage section 307 is inhibited without exception. When the radio button 501 is checked in this embodiment, and when a loopback address registration request is received from the external apparatus (image forming apparatus 102 or PC 103) or the self apparatus (image forming apparatus 101), a request source is notified of an error. Then, storage of an address including a loopback address in the address book storage section 307 is primarily inhibited.

The administrator selects (checks) a radio button 502 when registration of a loopback address in the address book of the image forming apparatus 101 is permitted, but any reference and access to the registered loopback address from the external apparatus such as the image forming apparatus 102 are inhibited. When this radio button 502 is checked, registration of a loopback address in the address book of the image forming apparatus 101 is permitted unlike in the case in which the radio button 501 is checked. However, when the image forming apparatus 102 issues, via the address book publication section 310, a reference request of the loopback address registered in the address book of the image forming apparatus 101, reference to the loopback address is inhibited. Note that reference and access to the loopback address, which is registered in the address book stored in the address book storage section 307, by the image forming apparatus 101 itself are permitted.

The administrator selects (checks) a radio button 503 when upon reception of a registration request of a loopback address in the address book of the image forming apparatus 101, the loopback address is converted into an address unique to a specific apparatus, and the converted address is registered. When the radio button 503 is checked, and a registration request of a loopback address (for example, "127.0.0.1") is accepted, that loopback address is converted into an IP address of a specific apparatus, and the converted address is registered in the address book. When this radio button 503 is selected (checked), one of radio buttons 5031, 5032, and 5033 is selectable.

When the radio button 5031 is selected (checked), a loopback address (for example, "127.0.0.1") is registered intact as an address designated by the loopback address. As a result, upon execution of processing for referring to a loopback address registered in the address book, and sending/transferring an image file using that loopback address, the image file is sent to an apparatus which executes the sending processing in a loopback mode. That is, when the apparatus which executes the sending processing is the image forming apparatus 102 (external address book reference section 410), the image file is sent to the image forming apparatus 102. On the other hand, when the apparatus which executes the sending processing is the image forming apparatus 101, the image file is sent to the image forming apparatus 101.

In this manner, when the radio button 5031 is checked, a situation in which an address varies depending on an apparatus which executes sending processing of an image file occurs. For this reason, a user who is poorly informed of a loopback address may be confused. In this embodiment, in order to give a warning about occurrence of such situation to a user who instructed an address registration request, a warning screen is displayed at the time of registration of a loopback address when the radio button 5031 is checked. For example, a warning screen which displays a message "if you register a loopback address in the address book, a file is likely to be sent to an unintended address when that loopback address is referred to from an external apparatus" is displayed.

When the radio button 5032 is selected (checked), a loopback address is converted into an IP address ("168.0.0.1") of the image forming apparatus 101 which stores that address book, and the converted address is registered. As a result, sending/transfer processing, which refers to and uses this IP address registered in the address book of the image forming apparatus 101 is executed for the image forming apparatus 101. In this way, when the radio button 5032 is checked, a loopback address is converted into an address unique to the image forming apparatus 101, and the converted address is registered in the address book. When sending processing of an image file is executed with reference to the address registered in the address book, the image file is always sent to the image forming apparatus 101 irrespective of an apparatus which executes the sending processing.

However, when a loopback address is converted into an address unique to the image forming apparatus 101 without exception in every situation, the following problem is posed. For example, it is potentially confusing when a user who is not aware of an actual storage apparatus of the address book issues a loopback address registration request. Assume that a user, who operates in front of the image forming apparatus 102, instructs to register a loopback address in the address book of the image forming apparatus 101. At this time, when the radio button 5032 is checked, the loopback address is converted into an address of the image forming apparatus 101, and the converted address is registered. In such case, the user who operated without knowing that the address book is stored in a remote apparatus (an apparatus different from the operating apparatus 102, that is, the image forming apparatus 101) may be confused. A case will be examined below wherein a user of the image forming apparatus 102 sends an image file from the image forming apparatus 101 with reference to an address registered in the address book. In this case, a situation in which although the user issued a sending instruction intended to send an image file to the image forming apparatus 102, the image file is unwantedly sent to the image forming apparatus 101 may occur. In consideration of such case, in this embodiment, when the radio button 5032 is checked, a warning screen which gives a warning against possibility of occurrence of the above situation is displayed for the user who issued the registration instruction.

Furthermore, when the radio button 5032 is checked, and the address unique to the image forming apparatus 101 is always registered independently of an apparatus which executes sending processing, a user who has a good knowledge of a loopback address may be confused. For example, an address intended as a destination address to be registered in the address book by a user who issued a registration instruction of a loopback address is often neither an address unique to the image forming apparatus 101 nor that unique to the image forming apparatus 102. For example, the user may want to use the address book using a loopback address as its original intended purpose, that is, by changing a destination address of an image file depending on an operating apparatus when he or she refers to an address registered in the address book. In consideration of such situation, in this embodiment, when the radio button 5032 is checked, a message which notifies the user that a loopback address is converted into an address unique to the image forming apparatus 101 and the converted address is registered in the address book is displayed.

When the radio button 5033 is selected (checked), a loopback address is converted into an IP address of an image forming apparatus (as a request source) which requested to register an address in the address book of the image forming apparatus 101, and the converted address is registered. Now assume that a registration request of an address in the address book of the image forming apparatus 101 is input from the self apparatus (the console unit 207 of the image forming apparatus 101). In this case, a loopback address is converted into an IP address ("168.0.0.1") of the image forming apparatus 101, and the converted address is registered. As a result, sending/transfer processing using this IP address is always executed for the image forming apparatus 101.

On the other hand, assume that a registration request of an address in the address book of the image forming apparatus 101 is issued from the console unit 207 of the image forming apparatus 102 while the radio button 5033 is selected (checked). In this case, a loopback address is converted into an IP address ("168.0.0.2") of the image forming apparatus 102, and the converted address is registered. As a result, sending/transfer processing using this IP address is executed for the image forming apparatus 102.

In this manner, when the radio button 5033 is checked, a loopback address is converted into an address unique to an apparatus as a registration request source, and the converted address is registered. In this manner, when sending processing of an image file is executed using the registered address, the image file is always sent to the apparatus as the registration request source of the address.

However, when a loopback address is converted into an address unique to an apparatus as a registration request source without exception in every situation, a user who has a good knowledge of a loopback address may be confused, as described above. For this reason, in this embodiment, when the radio button 5033 is checked, a message which notifies the user that a loopback address is automatically converted into an address unique to an apparatus as a registration request source is displayed.

When a radio button 504 is selected (checked), this means to confirm with an operator (a user who instructed to register a new address) at the time of registration of a loopback address. In this case, when an operator instructs to register an address, and designates a loopback address (for example, "127.0.0.1") via the console unit 207, a loopback address confirmation screen shown in FIG. 7 is displayed on the console unit 207. At this time, together with the loopback address confirmation screen, a message which gives a warning to the user against possibility of occurrence of a problem upon registration of the loopback address in the address book stored in the address book storage section 307 is also displayed. For example, a message "if you register a loopback address in the address book, a file is likely to be sent to an unintended address when the address is referred to from an external apparatus" is displayed.

In this way, the processing method to be executed is confirmed in response to a registration request of a loopback address. Although a detailed description about FIG. 7 will be given later, an address designated by an operator using one of radio buttons 701 to 703 in FIG. 7 is newly registered in the address book storage section 307. At this time, together with the confirmation screen, an warning screen (which gives a warning to the user against a problem which may occur when a loopback address is registered in the address book of the image forming apparatus 101) may also be displayed.

Upon pressing of an OK button 510 after completion of the setting using the loopback address setting screen shown in FIG. 5, the loopback address processing section 303 of the image forming apparatus 101 registers the set loopback address processing method in the address book storage section 307.

FIG. 6 shows an example of an address registration screen, which is displayed on the console unit 207 of the image forming apparatus 101 or 102, and is used to register an address in the address book.

Information, which is displayed and set on this address registration screen, is stored in the address book storage section 307 in the storage unit 204 managed by the address book processing section 302. This file sending destination setting screen is a setting screen used when an operator who uses the image forming apparatus 101 or 102 registers an address of a file sending destination in the address book. In this case, a case will be exemplified wherein the operator registers a new address in the address book of the image forming apparatus 101 by operating the address registration screen displayed on the console unit 207 of the image forming apparatus 102.

A "name" field 601 indicates an address name which is set upon registration of a new address. A "protocol" field 602 is used to set a protocol used upon sending a file by selecting it from, for example, SMB, WebDAV, and FTP. In FIG. 6, "SMB" is set. A "host name" field 603 is used to set an IP address or server name of a file sending destination. In this "host name" field 603, a character string such as an IP address (IPv4, IPv6), a server name, or FQDN, which is used to identify a specific apparatus on a network, is set. In this "host name" field 603, a loopback address can also be designated. FIG. 6 shows an example in which a loopback address (¥¥localhost) is set. A "folder path" field 604 is used to designate a path of a shared folder of a server as a file sending destination. In the image forming apparatuses 101 and 102, a folder path of the image file storage section 309, which is published as a file server, can be designated under the control of the file server control section 306. A "user name" field 605 and "password" field 606 are used to respectively set information of "user account" and "password" used in user authentication upon accessing a path designated by the "host name" field 603 and "folder path" field 604.

A case will be examined below wherein an administrator presses a registration button 610 at the image forming apparatus 102 after completion of the setting using this address registration screen. In this case, the address book processing section 302 registers the address in the address book storage section 307 of the image forming apparatus 101 via the external address book reference section 410 of the image forming apparatus 102 and address book publication section 310. In this case, when a loopback address is set in the "host name" field 603, the loopback address processing section 303 of the image forming apparatus 101 identifies the loopback address, and acquires the loopback address processing method recorded in the address book storage section 307. This loopback address processing method is set by the administrator using the loopback address setting screen shown in FIG. 5.

The loopback address processing section 303 recognizes that an address registration request source is the image forming apparatus 102. Then, the loopback address processing section 303 determines whether or not "inhibit registration of loopback address" is set as the loopback address processing method. This setting corresponds to that of the radio button 501 in FIG. 5. If this setting is made, the loopback address processing section 303 returns error information indicating that registration of a loopback address is inhibited to the address book processing section 302. In this way, an error is displayed on the console unit 207 of the image forming apparatus 102 via the address book publication section 310 and external address book reference section 410.

The loopback address processing section 303 determines whether or not "inhibit external access/delivery of loopback address" is set as the loopback address processing method. This setting corresponds to that of the radio button 502 in FIG. 5. If this setting is made, registration of a loopback address is permitted. However, when a reference request of the registered loopback address is received from an external apparatus such as the image forming apparatus 102 or PC 103, reference to the loopback address is inhibited, thereby inhibiting the external apparatus from using the loopback address.

The loopback address processing section 303 determines whether or not "conversion setting of loopback address into specific address" is set as the loopback address processing method. This setting corresponds to that of the radio button 503 in FIG. 5. If this button is selected, the loopback address processing section 303 converts the loopback address into an address unique to a specific apparatus and registers the converted address according to the radio button 5032 or 5033 previously selected by the administrator. If the radio button 5031 is selected, the loopback address processing section 303 registers the loopback address in the address book without converting it into a specific address.

The loopback address processing section 303 determines whether or not "confirmation of address at the time of registration of loopback address" is set as the loopback address processing method. This setting corresponds to that of the radio button 504 in FIG. 5. If this setting is made, the loopback address processing section 303 returns, to the address book processing section 302, an instruction indicating that how to register the loopback address in response to the loopback address registration request is confirmed with the operator who instructed to register an address. Thus, the loopback address confirmation screen exemplified in FIG. 7 is displayed on the console unit 207 of the image forming apparatus 102 via the address book publication section 310 and the external address book reference section 410. At this time, a warning screen (which gives a warning to the user against a problem which may occur upon registration of a loopback address in the address book of the image forming apparatus 101) may be displayed together with the loopback address confirmation screen. For example, a message "if you register a loopback address in the address book, a file is likely to be sent to an unintended address when that address is referred to from an external apparatus" is displayed.

FIG. 7 shows an example of the loopback address confirmation screen which makes confirmation of a loopback address with the operator when a loopback address is designated in the host name field on the file sending destination setting screen (FIG. 6) displayed on the console unit 207 of the image forming apparatus 101 or 102. This screen is displayed when the radio button 504 "confirm at the time of loopback address registration" shown in FIG. 5 is selected (checked), and a registration request of an address including a loopback address in the address book of the image forming apparatus 101 is input on the registration screen shown in FIG. 6. Information set using this loopback address confirmation screen is stored in the address book storage section 307 in the storage unit 204.

A case will be exemplified below wherein the operator designates a loopback address in the "host name" field 603 on the file sending destination setting screen (FIG. 6) displayed on the console unit 207 of the image forming apparatus 102 and registers it in the address book of the image forming apparatus 101 by operating the image forming apparatus 102.

When a radio button 701 is selected, an IP address of a sending source apparatus is always designated. Hence, in this case, a loopback address (for example, "127.0.0.1") is registered intact as an address in the address book. As a result, at the time of sending/transfer processing of an image file using this address, the image file is sent to an apparatus itself which executes the sending processing.

When a radio button 702 is selected, an IP address of an apparatus which possesses the address book is designated. That is, a loopback address is converted into an IP address ("168.0.0.1") of the image forming apparatus 101 which stores the address book, and the converted address is registered. As a result, sending/transfer processing using this address is executed for the image forming apparatus 101.

When a radio button 703 is selected, an IP address of an operating apparatus is designated. That is, a loopback address is converted into an address of the image forming apparatus which is accessing the address book, and the converted address is registered. As described above, when the address book of the image forming apparatus 101 is accessed via the console unit 207 of the image forming apparatus 102, the loopback address is registered as an IP address ("168.0.0.2") of the image forming apparatus 102. As a result, sending/transfer processing using this address is executed for the image forming apparatus 102.

In this manner, after completion of the setting of this loopback address confirmation screen, the operator presses an OK button 710. The external address book reference section 410 of the image forming apparatus 102 then registers the designated address in the address book storage section 307 of the image forming apparatus 101.

Note that when the operator wants to re-input an address without conversion of a loopback address on the loopback address confirmation screen shown in FIG. 7, he or she presses a cancel button 711. Then, the file sending destination setting screen shown in FIG. 6 is displayed again on the console unit 207 of the image forming apparatus 102. In this state, the operator can re-input an address in the "host name" field 603.

A sequence of processes executed when the operator registers an address including a loopback address in the address book of the image forming apparatus 101 by operating the image forming apparatus 102 will be described below with reference to the flowchart shown in FIG. 8.

Figure 8:
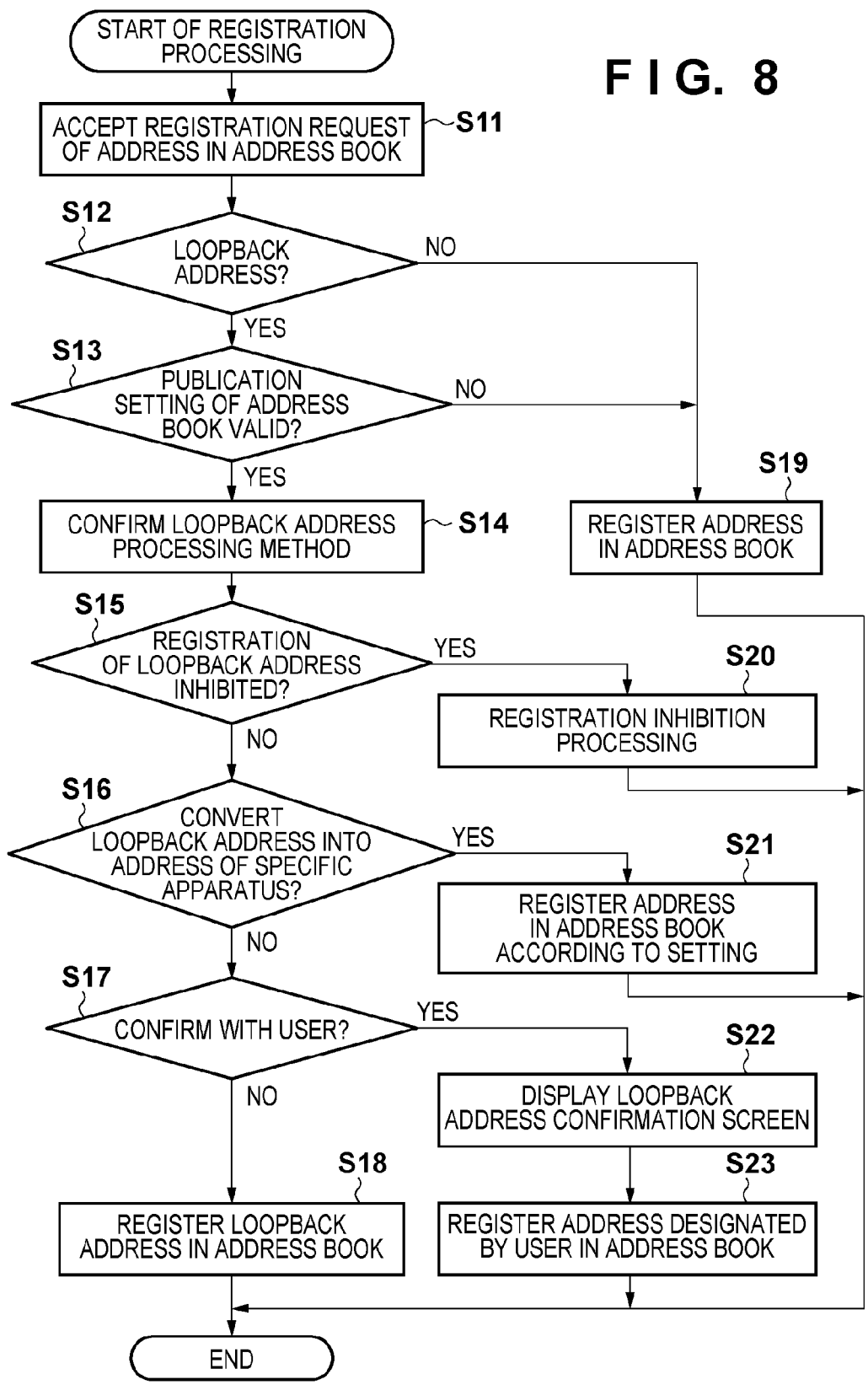
FIG. 8 is a flowchart for describing address registration processing in the image forming apparatus 101.

FIG. 8 is a flowchart for describing processing for registering an address in the address book in the image forming apparatus 101. A program which implements this processing is stored in the memory 202 or storage unit 204 of the image processing apparatus 101, and is expanded on the RAM of the memory 202 when it is executed under the control of the CPU 201 of the image forming apparatus 101.

More specifically, the registration processing by the image forming apparatus 101 upon reception of a registration request of an address in the address book from the image forming apparatus 102 will be explained.

In step S11, the address book processing section 302 accepts, from the external interface 203, a registration request of a new address in the address book storage section 307 from the image forming apparatus 102 input via the network 100. The accepted request includes information (an address name, sending method, sending protocol, host name, folder path, user name, password, etc.) to be registered in the address book stored in the address book storage section 307. These data are input via the touch panel or key input unit of the console unit 207 of the image forming apparatus 102.

The address book processing section 302 determines in step S12 whether or not an address included in the request accepted in step S11 includes a loopback address. More specifically, when an address is described as an IPv4 address, if "127.0.0.1" is designated in the address, it is determined that the loopback address is included. When an address is described as an IPv6 address, if "::1" is designated in the address, it is determined that the loopback address is included. When an address is described as a host name, if "localhost" is designated in the address, it is determined that the loopback address is included. If it is determined that the loopback address is included (YES in step S12), the process advances to step S13.

The address book processing section 302 determines in step S13 whether or not the address book publication section 310 publishes the address book stored in the address book storage section 307 to an external apparatus (whether or not the external publication setting is valid). The address book publication section 310 manages the external publication setting indicating whether or not the address book in the address book storage section 307 is published to the image forming apparatuses 102 and PC 103 connected to the network 100. If the address book processing section 302 acquires this external publication setting, and judges that the setting is valid, the process advances to step S14; otherwise, the process advances to step S19. Note that the setting as to whether or not to publish the address book is made in advance by the administrator in the image forming apparatus 101.

In step S14, when the accepted address includes the loopback address, the address book processing section 302 requests the loopback address processing section 303 to execute processing for the loopback address. Upon reception of the request, the loopback address processing section 303 confirms the loopback address processing method stored in the address book storage section 307, and determines how to register the address including the loopback address. The loopback address processing method stored in the address book storage section 307 is set in advance by the administrator on the loopback address setting screen shown in FIG. 5.

The loopback address processing section 303 determines in step S15 whether or not it is set to inhibit registration of a loopback address, as a result of confirming the loopback address processing method in step S14. This determination process is done based on the setting made in advance on the setting screen shown in FIG. 5. If the radio button 501 is checked on the setting screen shown in FIG. 5 to set the item "inhibit registration of loopback address" as the loopback address processing method, it is determined that registration of a loopback address in the address book is inhibited, and the process advances to step S20.

The loopback address processing section 303 determines in step S16 whether or not it is set to convert a loopback address into an address of a specific apparatus, as a result of confirmation of the loopback address processing method in step S14. This determination process is done by judging whether or not the item "convert loopback address into address of specific apparatus" is set by checking the radio button 503 on the setting screen shown in FIG. 5. If the item "convert loopback address into address of specific apparatus" is set, it is determined that a loopback address is converted into an address unique to another apparatus to be registered, and the process advances to step S21.

The loopback address processing section 303 determines in step S17 whether or not it is set to confirm with the user about the registration method of the loopback address, as a result of confirmation of the loopback address processing method in step S14. This confirmation includes options as to whether or not a loopback address is registered and whether or not a loopback address is converted into another address and the converted address is registered. In this determination process, if the item "confirm at the time of registration of loopback address" is set by checking the radio button 504 on the setting screen shown in FIG. 5, the process advances to step S22.

Step S18 is a process executed when NO is determined in all of the processes in steps S15 to S17. This process is executed when the item "inhibit external use/delivery of loopback address" is set by checking the radio button 502 on the setting screen shown in FIG. 5. When the item of the radio button 502 is set, registration of address information including the loopback address in the address book of the image forming apparatus 101 is permitted. Instead, any access to the loopback address registered in the address book of the image forming apparatus 101 from the external apparatus (for example, the image forming apparatus 102) is inhibited. That is, only the image forming apparatus 101 can refer to and access the loopback address registered in the address book. The address book processing section 302 registers address information (a address name, sending method, sending protocol, host name, folder path, user name, password, etc.) including the loopback address in the address book storage section 307 in accordance with the address information registration request accepted in step S11.

The process advances to step S19 if it is determined that the registration request accepted in step S11 does not include any loopback address (NO in step S12). If it is determined that the address book publication section 310 does not publish the address book stored in the address book storage section 307 to the external apparatus (NO in step S13), the process also advances to step S19. In step S19, the address book processing section 302 registers address information (an address name, sending method, sending protocol, host name, folder path, user name, password, etc.) included in the accepted registration request in the address book storage section 307.

Step S20 is a process executed when the item "inhibit registration of loopback address" is set on the setting screen shown in FIG. 5. In step S20, the loopback address processing section 303 generates an error message "registration of loopback address is inhibited", and sends the generated message to the image forming apparatus 102 via the external interface 203 and network 100. As a result, the error message is displayed on the console unit 207 of the image forming apparatus 102 which received the message, and the operator can confirm that registration of a new loopback address in the address book of the image forming apparatus 101 is inhibited. Note that as a modification, in place of inhibiting registration, for example, a message "if you register a loopback address in the address book, a file is likely to be sent to an unintended address when that address is referred to from an external apparatus" may be displayed on a warning screen. Then, after this warning, a loopback address may be registered according to, for example, a user's choice.

Step S21 is a process executed when the item "convert loopback address into address of specific apparatus" is set on the setting screen shown in FIG. 5. In step S21, the loopback address processing section 303 judges based on the setting of the item of each of the radio buttons 5031 to 5033 set in FIG. 5 to which address to be registered the address including the loopback address accepted in step S11 is to be converted. If the item of the radio button 5031 is set, the address book processing section 302 registers the address including the loopback address intact in the address book storage section 307. If the item of the radio button 5032 is set, the address book processing section 302 converts that address into an IP address ("168.0.0.1") of the image forming apparatus 101 in which the address book is registered, and registers the converted address. If the item of the radio button 5033 is set, the address book processing section 302 converts the address into an IP address of the apparatus which sent the registration request of the address in the address book, and registers the converted address. In this example, since a request source of registration of the address in the address book is the image forming apparatus 102, the address book processing section 302 converts that address into an IP address ("168.0.0.2") of the image forming apparatus 102, and registers the converted address. If a registration request source in step S11 is the console control section 301 of the image forming apparatus 101, the address is converted into an IP address of the image forming apparatus 101, and the converted address is registered. If a registration request source is the PC 103, the address is converted into an IP address of the PC 103, and the converted address is registered.

Note that according to this embodiment, when the radio button 5031 is selected, registration of the loopback address in the address book is consequently permitted, and when file sending processing is executed using the registered address, a file may be sent to an address which is not intended by the user. In consideration of such problem, when the radio button 5031 is selected, reference to the loopback address from the external apparatus may also be inhibited in the same manner as the item selected by the radio button 502.

Step S22 is a process executed when the item "confirm at the time of loopback address registration" is set on the setting screen shown in FIG. 5. In step S22, the loopback address processing section 303 acquires information of the loopback address confirmation screen (FIG. 7) stored in the address book storage section 307, and sends the acquired information to the apparatus (in this example, the image forming apparatus 102) which is accessing the address book registration screen (FIG. 6). The image forming apparatus 102 displays the loopback address confirmation screen based on the received information, and prompts the user which address is to be registered. At this time, together with the confirmation screen, a warning screen (which gives a warning to the user against a problem which may occur upon registration of a loopback address in the address book of the image forming apparatus 101) may be displayed. When the user selects one of the radio buttons 701 to 703 on the confirmation screen shown in FIG. 7 displayed on the console unit of the image forming apparatus 102, and presses the OK button 710, the image forming apparatus 102 sends information indicating the selected setting to the image forming apparatus 101, and the process advances to step S23.

In step S23, based on the information of the item set via the confirmation screen shown in FIG. 7, the loopback address is converted into an address designated by the user, and the converted address is registered in the address book. If the information sent in step S22 indicates "always sending source apparatus" of the radio button 701, the address book processing section 302 registers the loopback address intact in the address book storage section 307. If the information sent in step S22 indicates "address of an apparatus possessing the address book" of the radio button 702, the address book processing section 302 converts the loopback address into "168.0.0.1", and registers the converted address in the address book storage section 307. If the information sent in step S22 indicates "address of an apparatus for accessing address book" of the radio button 703, the address book processing section 302 converts the loopback address into "168.0.0.2", and registers the converted address in the address book storage section 307.

Note that according to this embodiment, when the radio button 701 is selected on the confirmation screen shown in FIG. 7, registration of a loopback address in the address book is consequently permitted. Then, a situation in which upon execution of file sending processing with reference to the registered loopback address, a file may be sent to an address which is not intended by the user may occur. In consideration of such situation, when the radio button 701 is selected, reference to the loopback address from external apparatuses may be inhibited in the same manner as the case in which the radio button 502 is selected.

According to this embodiment, the image forming apparatus 101, which serves as a server that can publish the address book, can register a new address in the address book storage section 307 in accordance with a registration request of an address in the address book accepted from the self apparatus or another apparatus (image forming apparatus 102 or PC 103). Furthermore, when the address to be registered in the address book includes a loopback address, registration of the address in the address book is restricted according to the loopback address processing method.

For example, registration of a loopback address in the image forming apparatus 101 as the server can be inhibited without exception. Thus, a destination address upon execution of file sending processing using the address in practice can be prevented from disagreeing with an address intended by the user who registers the address. Also, whether the user who registered the loopback address intends to register an address of an apparatus which issued the registration request, an address of the image forming apparatus 101 which possesses the address book, or the loopback address as its original intended purpose can be recognized. The original intended purpose of the loopback address uses an address of an apparatus to be operated when the registered address is used.

Also, a loopback address can be converted into another address (that of the image forming apparatus 101 as the apparatus in which the address book is registered or the apparatus which sent the registration request of an address in the address book), and the converted address can be registered. Thus, a destination of a file can be prevented from being changed depending on an apparatus which refers to the address upon using the address book.

Furthermore, when a loopback address is converted into another address, and the converted address is registered, the apparatus inquires the user who issued the registration request about to which address the loopback address is to be converted. Then, the loopback address is converted into another address according to the inquiry result. As a result, the loopback address can be converted in consideration of an apparatus to which the user who issued the registration request of the loopback address wants to send a file by registering the address.

Moreover, when a loopback address is converted into another address, and the converted address is registered, to which address the loopback address is to be converted can be selected using the prescribed loopback address processing method (that is, the setting of the radio button 503).

Note that FIG. 8 has explained the case in which the image forming apparatus 102 issues a registration request of a new address in the address book of the image forming apparatus 101. However, the processing shown in FIG. 8 can be similarly applied to a case in which the image forming apparatus 101 registers a new address in the address book of the self apparatus.

A sequence of processes executed when an address registered in the address book of the image forming apparatus 101 is referred to will be described below with reference to the flowchart shown in FIG. 9. A program which implements this processing is stored in the memory 202 or storage unit 204 of the image processing apparatus 101, and is expanded on the RAM of the memory 202 when it is executed under the control of the CPU 201 of the image forming apparatus 101.

Figure 9:
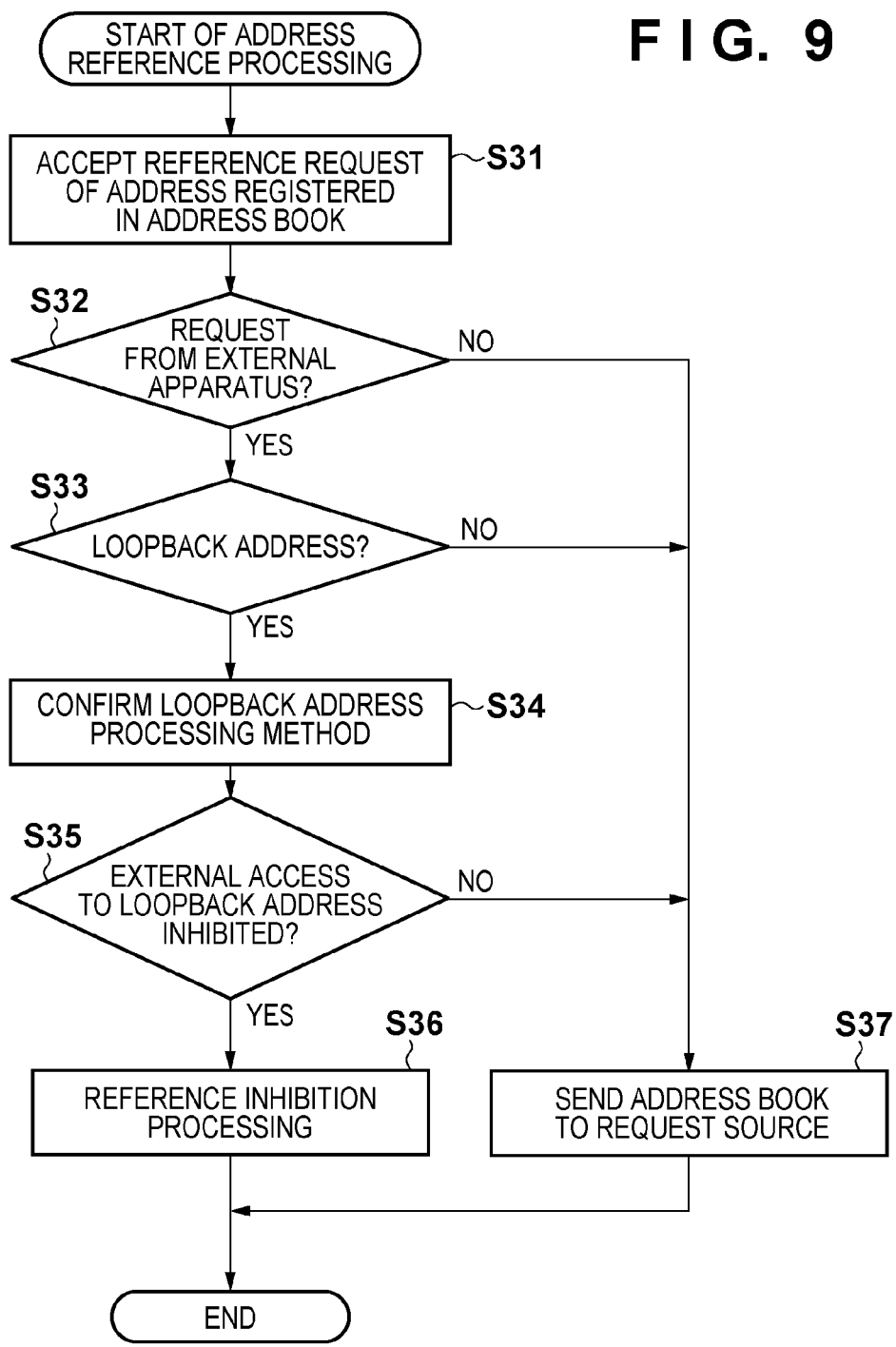
FIG. 9 is a flowchart for describing address reference processing in the image forming apparatus 101.

The processing shown in the flowchart of FIG. 9 is started when a reference request of an address registered in the address book of the image forming apparatus 101 serving as a server is accepted from the self apparatus or external apparatus (image forming apparatus 102 or PC 103). The reference request of an address registered in the address book includes, for example, that upon sending an image file input from the scanner unit 205 or storage unit 204 and that upon setting a transfer condition stored in the sending setting storage section 308.

In step S31, the address book processing section 302 accepts a reference request of a specific address registered in the address book in the address book storage section 307 via the external interface 203 or console control section 301. The accepted request includes an identifier which designates an address to be referred to of a plurality of addresses registered in the address book. Note that an address registered in the address book in the address book storage section 307 may include a loopback address. Note that this embodiment will explain a case in which a reference request of a specific address registered in the address book storage section 307 is accepted. Alternatively, a simultaneous reference request of the address book in the address book storage section 307 may be accepted.

The address book processing section 302 determines in step S32 whether the request accepted in step S31 is that from an external apparatus (image forming apparatus 102 or PC 103) or that from the self apparatus (image forming apparatus 101). More specifically, it is determined that the request which is accepted via the external interface 203 is that from the external apparatus. Also, it is determined that the request which is accepted via the console control section 301 is that from the self apparatus 101. If the accepted request is that from the external apparatus, the process advances to step S33; otherwise, the process advances to step S37.

In step S33, the address book processing section 302 instructs the loopback address processing section 303 to determine whether or not the address, which is specified by the accepted reference request and is registered in the address book, is a loopback address. If it is determined that the address is a loopback address, the process advances to step S34. In step S34, the loopback address processing section 303 confirms the loopback address processing method stored in the address book storage section 307 to determine whether or not the external apparatus is permitted to refer to the loopback address registered in the address book.

The process then advances to step S35. The loopback address processing section 303 determines as a result of confirmation of the loopback address processing method in step S34 whether or not it is set to inhibit external access to the loopback address. This determination process is done based on the setting, which is set in advance on the setting screen shown in FIG. 5. If the radio button 502 is checked on the setting screen shown in FIG. 5 to select "inhibit external access to loopback address", it is determined that any reference and access to a loopback address based on the reference request from the external apparatus are inhibited, and the process advances to step S36.

In step S36, the address book processing section 302 inhibits reference to the loopback address based on the reference request of the address accepted in step S31. More specifically, the loopback address processing section 303 generates an error message "reference to the loopback address is inhibited", and sends the generated message to the image forming apparatus 102 via the external interface 203 and network 100. As a result, the error message is displayed on the console unit 207 of the image forming apparatus 102 which received the message, and reference to the loopback address registered in the image forming apparatus 101 is inhibited. Note that as a modification, in place of inhibiting reference to the loopback address, a warning screen may be displayed. In this case, when the user designates to continue reference to that address, reference to the loopback address may be permitted.

As another modification, external reference to the loopback address may be permitted, but the use purpose, that is, sending/transfer processing of an image file by the external apparatus using the loopback address may be inhibited.

In addition, the loopback address may be sent to the external apparatus by appending an attribute indicating that the address is invalid. Furthermore, publication of the address book itself which includes the loopback address may be inhibited.

Note that this embodiment has explained the example in which a reference request of only a specific address registered in the address book is accepted in step S31. However, in step S31, if addresses registered in the address book are allowed to be simultaneously referred to, then a list of addresses other than loopback addresses specified by the processing section 303 may be sent to a request source of the request accepted in step S31.

If it is determined that the reference request of the address registered in the address book is that from the self apparatus (NO in step S32), or if it is determined that addresses registered in the address book of the image forming apparatus 101 do not include any loopback address (NO in step S33), the process advances to step S37. In step S37, the address book processing section 302 of the image forming apparatus 101 sends the address book stored in the address book storage section 307 to the request source via the console control section 301 or external interface 203.

As described above, according to this embodiment, the image forming apparatus 101, which serves as the server, can publish the address book stored in the self apparatus to external apparatuses. Then, the image forming apparatus 102, which serves as the client, can refer to addresses registered in the address book published by the image forming apparatus 101. In this way, when the address book publication section 310 of the image forming apparatus 101 cooperates with the external address book reference section 410 of the image forming apparatus 102, the image forming apparatus 102 is allowed to access the address book stored in the address book storage section 307 of the image forming apparatus 101. For this reason, when one apparatus, which serves as the server, possesses the address book, other apparatuses need not possess any address book since external apparatuses can refer to addresses registered in the address book.

Furthermore, according to this embodiment, if the address book possessed by the image forming apparatus 101 includes a loopback address, the address book including the loopback address can be inhibited from being accessed (used) by the external apparatus. For this reason, when the image forming apparatus 101 which possesses the address book is different from an apparatus which uses the address book, a file can be prevented from being sent to an address which is not intended by the user. That is, a situation in which although the user intends to send a file to the image forming apparatus 101, the file is unwantedly sent to the image forming apparatus 102 when the image forming apparatus 102 refers to the address can be prevented.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-276385, filed Dec. 10, 2010, which is hereby incorporated by reference herein in its entirety.

What is claimed is:

1. A data communication apparatus for communicating with another data communication apparatus via a network, comprising:
   an address book storage unit configured to manage an address book in which a plurality of addresses used to send an image file are registered;
   an address book transmission unit configured to transmit the address book managed by the address book storage unit to another data communication apparatus via the network; and
   a control unit configured to restrict, in a case that a loopback address is included in any one of the plurality of addresses registered in the address book, the another data communication apparatus from transmitting an image file using the loopback address.

2. The apparatus according to claim 1, wherein in a case that the loopback address is included in any one of the plurality of addresses registered in the address book, the control unit controls the another data communication apparatus not to access the loopback address in the address book.

3. The apparatus according to claim 1, wherein in a case that the loopback address is included in any one of the plurality of addresses registered in the address book, the control unit inhibits the address book transmission unit from transmitting the loopback address in the address book which is stored in the address book storage unit.

4. The apparatus according to claim 1, further comprising:
   a scanning unit configured to scan an original to generate image data; and
   a sending unit configured to send the image data to an address selected by a user from the plurality of addresses registered in the address book.

5. The apparatus according to claim 1, wherein the address book storage unit further manages a destination name, a transmission method, a transmission protocol, a user name, or a password.

6. The apparatus according to claim 1, wherein the control unit converts the loopback address into an IP address of another data communication apparatus, and the address book transmission unit transmits the address book which includes the IP address of the another data communication apparatus.

7. The apparatus according to claim 1, wherein the control unit converts the loopback address into an IP address of the data communication apparatus, and the address book transmission unit transmits the address book which includes the IP address of the data communication apparatus.

8. A method of controlling a data communication apparatus for communicating with another data communication apparatus via a network, the method comprising:
   managing an address book in which a plurality of addresses used to send an image file are registered;
   transmitting the managed address book to another data communication apparatus via the network; and
   restricting, in a case that a loopback address is included in any one of the plurality of addresses registered in the address book, the another data communication apparatus from transmitting an image file using loopback address.

9. The apparatus according to claim 1, further comprising a setting unit configured to set a restriction for restricting the another data communication apparatus from utilizing the loopback address, by a user,
   wherein the control unit restricts the another data communication apparatus from transmitting an image file using the loopback address, in a case that the loopback address is included in any one of the plurality of addresses registered in the address book and the restriction is set by the setting unit.

10. The apparatus according to claim 9, wherein the control unit permits the another data communication apparatus to transmit an image file using the loopback address in a case where the restriction is not set by the setting unit, even if the loopback address is included in any one of the plurality of addresses registered in the address book.

\* \* \* \* \*